United States Patent
Piacentini

(12) 
(10) Patent No.: US 6,493,079 B1
(45) Date of Patent: Dec. 10, 2002

(54) SYSTEM AND METHOD FOR MACHINE VISION ANALYSIS OF AN OBJECT USING A REDUCED NUMBER OF CAMERAS

(75) Inventor: Ignazio Piacentini, Milan (IT)

(73) Assignee: National Instruments Corporation, Austin, TX (US)

( * ) Notice: Subject to any disclaimer, the term of this patent is extended or adjusted under 35 U.S.C. 154(b) by 88 days.

(21) Appl. No.: 09/656,571

(22) Filed: Sep. 7, 2000

(51) Int. Cl.$^7$ .......................... G01N 21/00; G06K 9/00
(52) U.S. Cl. .................... 356/240.1; 382/141
(58) Field of Search .................... 356/237.1–237.3, 356/240.1, 625, 627, 628, 634, 635, 638–640; 382/141, 154

(56) References Cited

U.S. PATENT DOCUMENTS

| | | | |
|---|---|---|---|
| 5,365,596 A | * 11/1994 | Dante et al. | 382/8 |
| 5,768,443 A | 6/1998 | Michael et al. | 382/294 |
| 5,803,702 A | * 9/1998 | Mullins et al. | 414/788.7 |
| 5,969,823 A | * 10/1999 | Wurz et al. | 356/386 |
| 5,991,041 A | * 11/1999 | Woodworth | 356/376 |
| 6,064,759 A | * 5/2000 | Buckley et al. | 382/154 |
| 6,154,567 A | 11/2000 | McGarry | 382/219 |
| 6,175,644 B1 | 1/2001 | Scola et al. | 382/141 |
| 6,175,652 B1 | 1/2001 | Jacobson et al. | 382/216 |

* cited by examiner

*Primary Examiner*—Michael P. Stafira
(74) *Attorney, Agent, or Firm*—Conley, Rose & Tayon PC; Jeffrey C. Hood; Jason L. Burgess

(57) ABSTRACT

A system and method for analyzing an object using a reduced number of cameras and/or a reduced number of acquired images. The system and method may be utilized in a machine vision application, e.g., in order to inspect manufactured objects. The method may operate to acquire an image, or a plurality of images, of the object. In order to reduce the number of images that need to be acquired, at least one of the acquired images includes visual information for two or more sides of the object. Such an image may be acquired by a camera positioned in any of various ways such that the camera can capture visual information for multiple sides of the object. The acquired images of the object may then be received by computer systems connected to the cameras and analyzed using image processing software. For each image that includes visual information for multiple sides of the object, analyzing the image may comprise determining regions of interest within the image, wherein each region of interest corresponds to one side of the object. Each of these regions of interest may then be analyzed separately. In a machine vision manufacturing application, the results of the image analyses may be used to determine whether the object meets desired production standards. The images or ROIs may be analyzed using any of various techniques or algorithms designed to detect any of various characteristics or defects of the object.

19 Claims, 11 Drawing Sheets

SYSTEM AND METHOD FOR MACHINE VISION ANALYSIS OF AN OBJECT USING A REDUCED NUMBER OF CAMERAS

FIELD OF THE INVENTION

The present invention relates to the field of machine vision applications, and more particularly to a system and method for performing machine vision analysis of an object using a reduced number of cameras.

DESCRIPTION OF THE RELATED ART

In many machine vision applications, machine vision analysis is required of a three dimensional object, such as a rectangular prism or cube. For example, in manufacturing applications, machine vision analysis may be used to detect defects in a manufactured object by acquiring images of the object and using various types of image processing algorithms to analyze the images. As an example, a system to manufacture electrical components such as capacitors may use machine vision to examine each side of the capacitors in order to detect manufacturing defects, ensure that the capacitors are labeled, marked, or color coded properly, etc.

Machine vision applications may use image processing software operable to perform any of various types of image analysis or image processing functions or algorithms in examining an acquired image of an object. For example, pattern matching algorithms are often used, e.g., in order to compare the pattern information of the acquired image to the pattern information of a template image. Color matching algorithms may also be used, e.g., in order to compare the color information of the acquired image to the color information of a template image. Blob (Binary Large Object) analysis tools may also be used to examine an image. In various applications, pattern, color and/or Blob analysis information may be used to verify that: an object includes all necessary components in the correct locations, an object has the appropriate words, labels, or markings, an object surface is not scratched or otherwise defective, etc.

Any of type of camera or other device may be used to acquire the images to be analyzed in a machine vision application, including digital cameras, frame grabbers, line scan cameras, etc. As used herein, the term "camera" is intended to encompass all such devices.

Prior art machine vision systems have required a separate image to be acquired and analyzed for each individual side of an object for which machine vision analysis is necessary. For example, in order to analyze a capacitor having six sides, a prior art system uses 6 cameras to acquire six separate images and analyze each of these images. FIG. 1 illustrates a prior art system in which a camera 10 is faced perpendicularly to a side of a cube-shaped object. Thus, the camera 10 may acquire an image including visual information of side 2 of the object but not including visual information from the other sides of the object. In order to analyze other sides of the object, additional images must be acquired. For example, FIG. 2 illustrate a prior art system including four cameras 10A, 10B, 10C, and 10D, in which the cameras are able to acquire images of sides 2, 1, 3, and 6, respectively, of the object. In order to image the top side 4 and the bottom side 5 of the object, two additional images must be acquired, which requires two additional cameras in prior art systems.

In various situations, there are several disadvantages associated with the prior art approach described above. For example, the acquisition and processing of a separate image for each object side of interest may be inefficient. Thus, it may be desirable to reduce the number of images that need to be acquired in order to examine the object, and hence reduce the number of cameras required in a machine vision system. For example, the cost of a having a separate camera dedicated to each side of the object may be prohibitive. Also, it may be desirable to position the cameras in locations other than perpendicularly facing the object sides. For example, due to the physical environment of a particular manufacturing facility, it may be necessary to position the cameras elsewhere, e.g., facing the object along a diagonal axis extending through opposite corners of the object.

SUMMARY OF THE INVENTION

One embodiment of the present invention comprises a system and method for analyzing a physical object (or a plurality of physical objects) using a reduced number of cameras and/or a reduced number of acquired images. The object may be shaped in various ways and may have any of various sizes. In one exemplary embodiment, the object is shaped like a cube or rectangular prism having six sides.

The system and method may be utilized in a machine vision application, e.g., in order to inspect manufactured objects. The method may operate to acquire an image, or a plurality of images, of the object. hi order to reduce the number of images that need to be acquired, at least one of the acquired images includes visual information for two or more sides of the object. In one embodiment, all of the acquired images include visual information for two or more sides of the object. Such an image may be acquired by a camera positioned in any of various ways such that the camera can capture visual information for multiple sides of the object.

In one embodiment, at least one of the acquired images includes visual information for three or more sides of the object. For example, with respect to an object shaped as a six-sided rectangular prism, such an image may be acquired by a camera positioned along an imaginary diagonal axis passing through the middle of the object that connects two opposite corners of the rectangular prism, wherein one corner is defined by the intersection of the three planes comprising the three sides of the rectangular prism for which visual information is acquired and the other corner is defined by the intersection of the three planes comprising the other three sides of the rectangular prism (see FIGS. 5 and 6). Such an image may also be acquired by a camera that is not positioned exactly along this axis but is positioned similarly such that the camera can acquire visual information for three sides of the object.

The acquired images of the object may then be received by a computer system and analyzed using image processing software. One embodiment of the invention comprises image processing software operable to analyze the acquired images, including the image(s) that each include visual information for multiple sides of the object. The image processing software may be operable to separate the visual information associated with each of the multiple sides of the object captured in an acquired image, e.g., to separate ROIs associated with each of the multiple sides captured in the acquired image. The image processing software may then separately analyze the visual information associated with each of the multiple sides of the object.

In one embodiment, the images may be received by a plurality of computer systems, or a plurality of image acquisition devices coupled to or comprised in a single computer system, in order to perform the analyses at a faster rate. For example, for each camera, a separate computer system connected to the camera may receive the image acquired by the camera and analyze the received images. Alternatively, for each camera, a separate image acquisition device or board coupled to the camera may capture the image, and on-board processor may analyze the captured image, or a host computer may analyze captured images from each of the image acquisition devices.

For each image that includes visual information for multiple sides of the object, analyzing the image may comprise determining regions of interest (ROIs) within the image, wherein each region of interest corresponds to one side of the object. The regions of interest within the image may be determined in various ways. For example, in one embodiment, the system is operable to acquire images such that the regions of interest have predetermined boundaries within the image. For example, the image acquisitions may be precisely coordinated with the movement and positioning of the object on an assembly line, using timing or motion control techniques. In another embodiment, the regions of interest corresponding to the object sides may be determined using image processing techniques, such as edge detection algorithms, pattern matching, color matching, Blob analysis, etc.

Once the regions of interest (ROIs) are determined, the ROIs may then be analyzed separately. Due to the angle and spatial orientation of the object with respect to a camera positioned to acquire visual information from multiple sides of the object, the ROIs may be non-rectangular regions. Thus, the image processing software may be operable to analyze non-rectangular regions of interest for defects, correct labeling, correct markings, etc.

The images or ROIs may be analyzed using any of various techniques or algorithms designed to detect any of various characteristics or defects of the object. For example, analyzing the images may comprise performing pattern matching algorithms, color matching algorithms, color and pattern matching algorithms, Blob analysis, character recognition, etc., in order to detect one or more characteristics of the object such as: physical surface defects (scratches, etc.); one or more components located correctly on the object; a correct label on the object; a correct marking on the object; correct color information on the object, etc.

The analyses performed on each image and/or performed on each region of interest (ROI) within an image may differ. For example, different sides of the object may require different types of inspection, e.g., in order to check for a correct label on one side and a set of correct components on another side.

For images including visual information from multiple sides of the object, the analyses performed on the ROIs corresponding to the sides of the object may take into account any skewing or distortion of the visual information of each side, as well as any variation in the lighting conditions of each side, which may be caused by the angle or spatial orientation of the object side with respect to the camera that acquired the image. For example, if the analysis performed for an ROI comprises performing a pattern matching algorithm, the pattern matching algorithm and/or the template image which the pattern information of the ROI is compared against may be different from what would otherwise be used if the image had been acquired from a camera faced perpendicularly to the plane comprising the object side (i.e., from a camera positioned as shown in the prior art FIGS. 1 and 2). In this case, for example, a "skewed" template image to be used in the pattern matching may be stored so that the pattern information of this template image will match the pattern information of the ROI, i.e., the angle and spatial orientation of the template image may match the angle and spatial orientation of the ROI. In another embodiment, the pattern matching algorithm may be altered to account for any skewing of the pattern information, e.g., by taking into account the depth of field of the camera, foreshortening of the image, etc.

In a machine vision manufacturing application, the results of the image analyses may be used to determine whether the object meets desired production standards. If separate computer systems are used to analyze the images, the results from each computer system may be considered together in making this determination. For example, another computer system may receive the results from each of these computer systems and determine whether the object meets the desired production standards, based on the results. This determination may be performed in any of various ways, as desired for a particular application. If the object does not meet the desired production standards, the object may be rejected. For example, the object may be removed from an assembly line or the system may store information indicating that the object failed the inspection. Also, images of the rejected object may be stored if desired.

One particular exemplary application is described in order to provide details regarding one specific embodiment of the system and method described above. In this example, the machine vision system analyzes manufactured capacitors having a rectangular prism shape are mounted on a lead frame carrier. Capacitor bodies project above and below the lead frame carrier, so that the lead frame carrier effectively divides the four lateral sides into two halves. Thus, the capacitor bodies effectively have ten sides: a top side, a bottom side, and eight (4*2) lateral sides. A machine vision system may be operable to inspect each of these ten sides, using a total of four cameras.

The capacitor bodies may be mounted very close together on the lead frame carrier, making it difficult for a camera to image the sides of the capacitor bodies that face each other. Thus, in order to acquire images of all the sides, the lead frame carrier may be passed over a set of sprockets causing the carrier to flex. As a pair of two consecutive capacitor bodies passes over the top of one sprocket, the gap effectively widens between the pair of capacitor bodies, allowing one camera to image the inner side of one of the capacitor bodies and allowing another camera to image the inner side of the other capacitor body. Also, one of the cameras can image the top and one of the outer sides of one of the capacitor bodies, and the other camera can image the top and the other outer side of the other capacitor body, so that each camera acquires visual information from three sides. Thus, the two cameras can together image each of the five upper sides of the capacitor bodies. Another two cameras mounted below another sprocket can image each of the five lower sides of the capacitor bodies in a similar manner.

The top side of the capacitor bodies may be marked with text. Thus, the analysis performed for the region of interest in the image that corresponds to the top side may comprise performing a pattern matching algorithm. The remaining sides of the capacitor bodies may be expected to have a uniform color and surface unless defective. Thus, simpler imaging processing functions may be used to analyze these sides. Upon detection of a faulty capacitor, the corresponding image may be stored as a file. The position of the faulty capacitor may be tracked, and the capacitor may be removed from the lead frame carrier when appropriate.

BRIEF DESCRIPTION OF THE DRAWINGS

A better understanding of the present invention can be obtained when the following detailed description of the preferred embodiment is considered in conjunction with the following drawings, in which.

Figure 1:
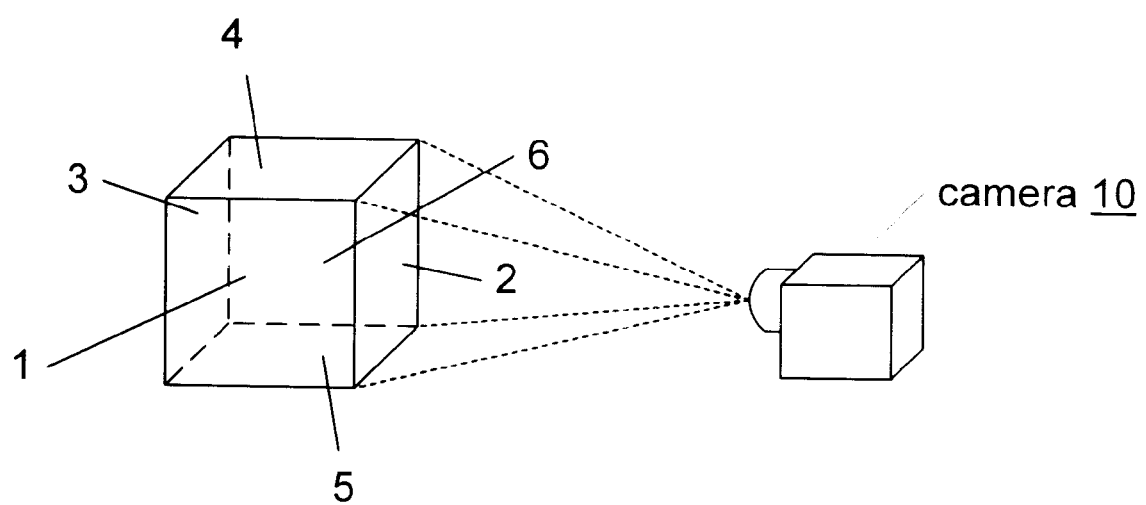
FIG. 1 illustrates a prior art system in which a camera is faced perpendicularly to a side of a cube-shaped object such that the camera may acquire an image including visual information of one side of the object.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following patent applications are hereby incorporated by reference in their entirety as though fully and completely set forth herein:

U.S. patent application Ser. No. 09/227,506 titled "Pattern Matching System and Method Which Performs Local Stability Analysis for Improved Efficiency" filed on Jan. 6, 1999, whose inventors were Dinesh Nair, Lothar Wenzel, Nicolas Vazquez, and Samson DeKey;

U.S. patent application Ser. No. 09/638,271 titled "System and Method for Locating Color and Pattern Match Regions in a Target Image," filed on Aug. 14, 2000;

U.S. patent application Ser. No. 09/639,420 titled "System and Method for Locating Color Match Regions in a Target Image," filed on Aug. 14, 2000; and

Figure 3:
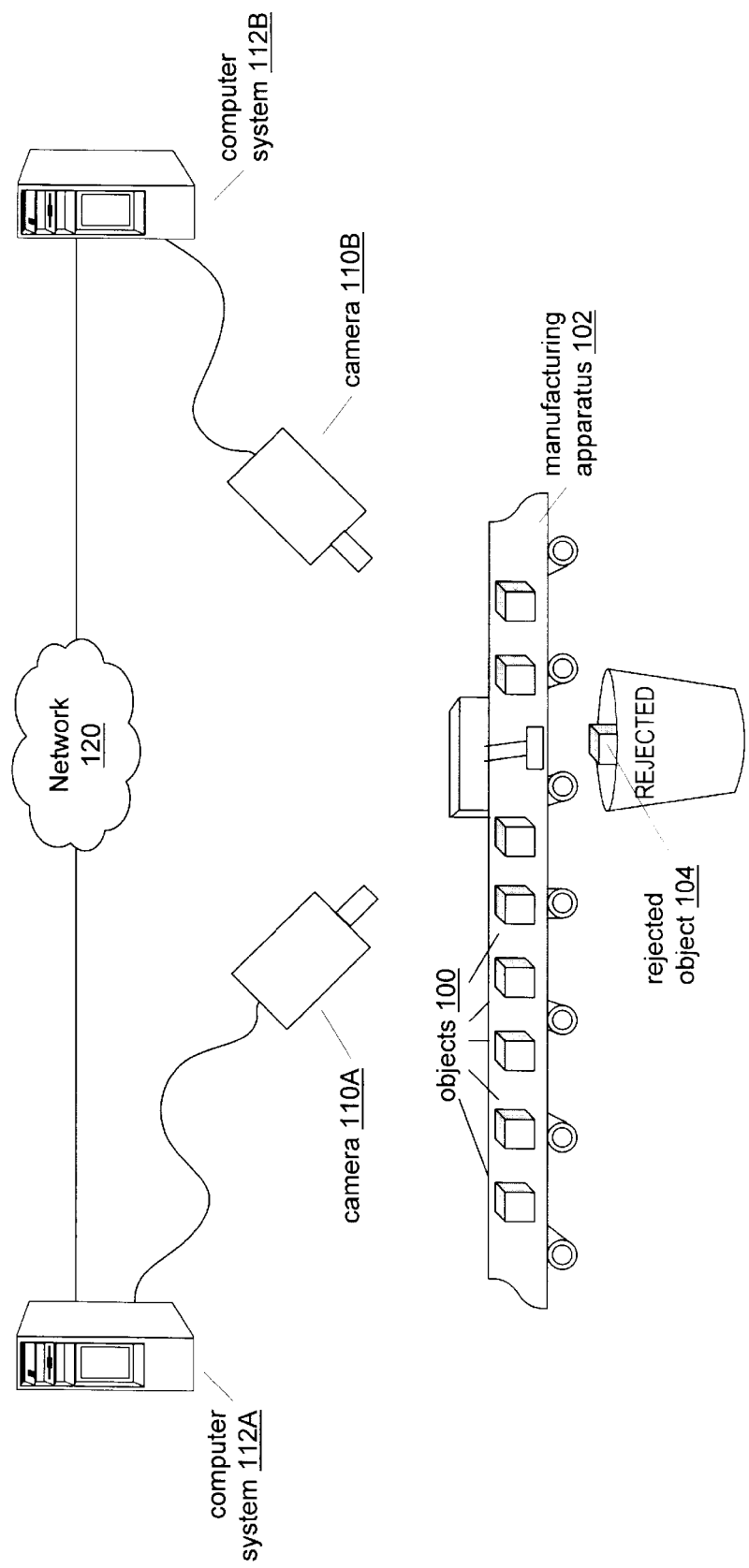
FIG. 3 is a block diagram illustrating one embodiment of a machine vision system for inspecting manufactured objects according to one embodiment of the invention.

FIG. 3—Machine Vision System

FIG. 3 is a block diagram illustrating one embodiment of a machine vision system (also referred to as an image acquisition and analysis system) for inspecting manufactured objects. The objects may be any of various devices or components that have two or more sides. The system of FIG. 3 illustrates a plurality of objects 100 which move along a manufacturing apparatus 102. The objects 100 may have a plurality of sides and may have any of various types of shapes and sizes. The system includes one or more cameras 110 operable to acquire images of the objects 100. In this example, two cameras (110A and 110B) are shown, but in other embodiments any number of cameras may be used. The cameras 110 may comprise any type of cameras or devices operable to acquire images of the objects 100. As described below, at least one of the cameras 110 is positioned such that images acquired by the camera include visual information for multiple sides of an object.

In the example of FIG. 3, each camera 110 is connected to a separate computer system 112, which is operable to receive the images acquired by the camera. In another embodiment, a single computer system 112 may receive acquired images from multiple cameras. For example, the single computer system 112 may include one or multiple image acquisition boards, each for capturing one or more images. The computer system 112 may then analyze the images captured by each of the image acquisition boards. Alternatively, the each of the image acquisition boards may include on-board processors and memory for performing a portion or all of the image analysis. For example, each of the image acquisition boards may process a captured image to isolate visual information or ROIs from multiple sides of the object, and then provide the separate ROIs to the computer system 112 for further processing.

As described below with reference to FIG. 4, the computer systems 112 may be computer systems of any type. In one embodiment, each computer system 112 comprises a controller or card (a "computer on a card") housed in a PXI or VXI chassis. The chassis may further include one or more image acquisition boards which couple to one or more cameras.

The computer system(s) 112 may use or store image processing software according to one embodiment of the present invention. The computer system(s) 112 preferably include a memory medium on which software operable to receive and analyze the object images is stored. The term "memory medium" is intended to include an installation medium, e.g., a CD-ROM, floppy disks 104, or tape device, a computer system memory or random access memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system(s) 112 may take various forms, including a personal computer system, PXI or VXI card, mainframe computer system, workstation, network appliance, or other device. In general, the term "computer system" can be broadly defined to encompass any device having at least one processor which executes instructions from a memory medium.

The images received from the cameras 110 may be analyzed using the image processing software executing on the computer system(s) 112. The analyses of the images may be used to detect defects or other characteristics of the objects 100. For example, in various applications the analyses may be designed to detect one or more of: physical surface defects (scratches, etc.); one or more components located correctly on the object; a correct label on the object; a correct marking on the object; correct color information on the object, etc. For an image that includes visual information for multiple sides of an object, the analysis of the image may comprise determining regions of interest within the image that correspond to the sides of the object. These regions of interest may then be analyzed separately. Analysis of the images is discussed in more detail below.

In a machine vision manufacturing application, the results of the image analyses may be used to determine whether an object meets desired production standards. If separate computer systems are used to analyze the images, as in the example of FIG. 3, the results from each computer system may be considered together in making this determination. For example, as shown in FIG. 3, the computer systems 112 may be connected via a network 120 such as a LAN or intranet. Another computer system connected to the network 120 may receive the results from each of the computer systems 112 and determine whether an object meets the desired production standards, based on the analysis results. This determination may be performed in any of various ways, as desired for a particular application. If the object does not meet the desired production standards, the object may be rejected. For example, in rejecting the object, the object may be removed from an assembly line as indicated in FIG. 3 by the rejected object 104, or the system may store information indicating that the object failed the inspection. Also, images of the rejected object may be stored if desired.

Figure 4:
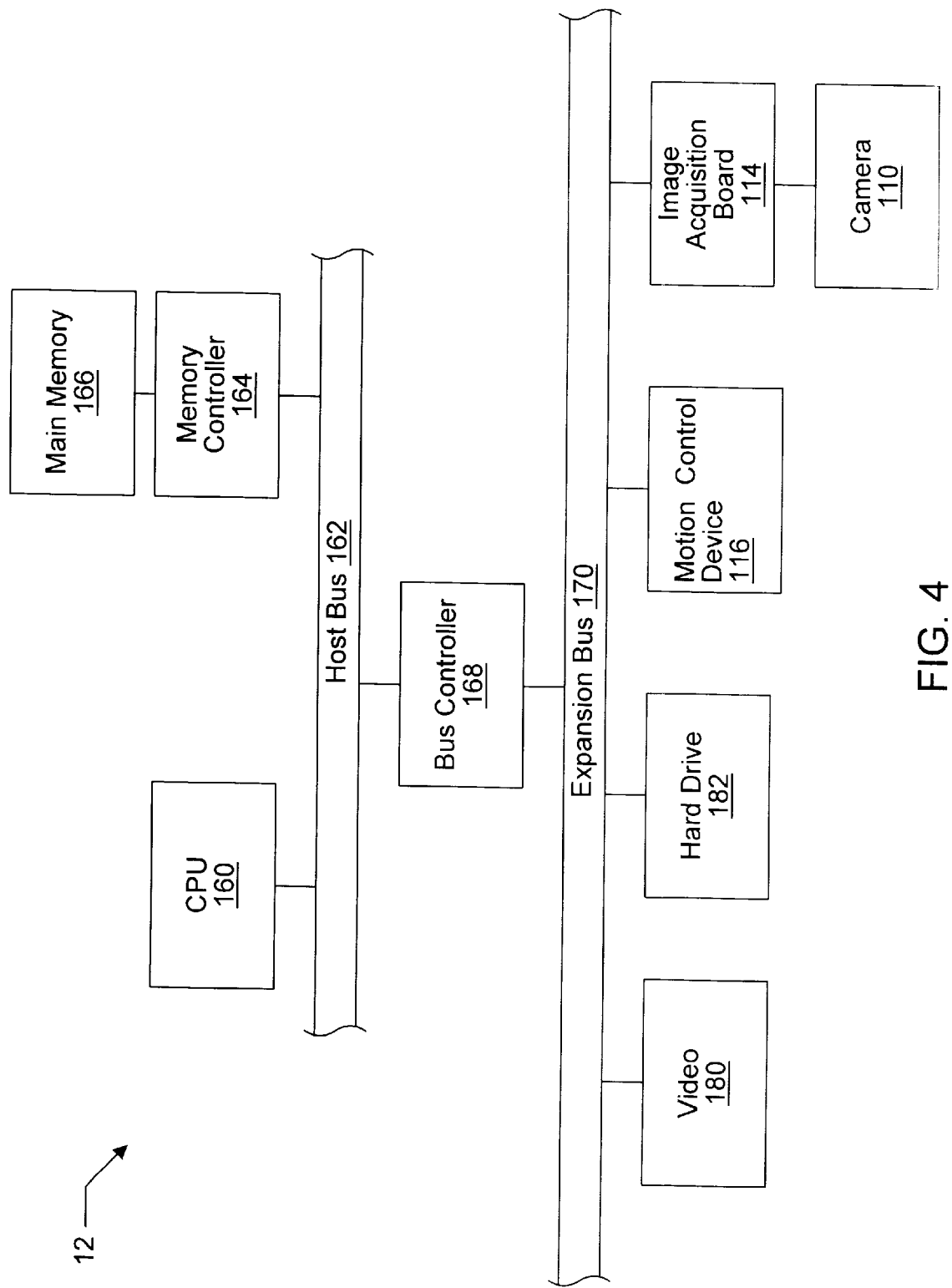
FIG. 4 is an exemplary block diagram illustrating one embodiment of computer systems illustrated in FIG. 3.

FIG. 4—Computer System Block Diagram

FIG. 4 is an exemplary block diagram illustrating one embodiment of the computer systems 112 illustrated in FIG. 3. It is noted that any type of computer system configuration or architecture can be used as desired, and FIG. 4 illustrates a representative PC embodiment. A computer system 112 may be a general purpose computer system. As noted above, a computer system 112 may also be a computer implemented on a PXI card installed in a PXI chassis. A computer system 112 may also be a computer implemented on a VXI card installed in a VXI chassis, or other type of computer system. The elements of a computer not necessary to understand the present invention have been omitted from FIG. 4 for simplicity.

The computer 112 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store image processing software according to one embodiment of the present invention. The main memory 166 may also store operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 may include slots for various devices such as an image acquisition card 114, a motion control card 116, and possibly other devices. The computer 102 may further comprise a video display subsystem 180 and hard drive 182 coupled to the expansion bus 170.

Figure 5:
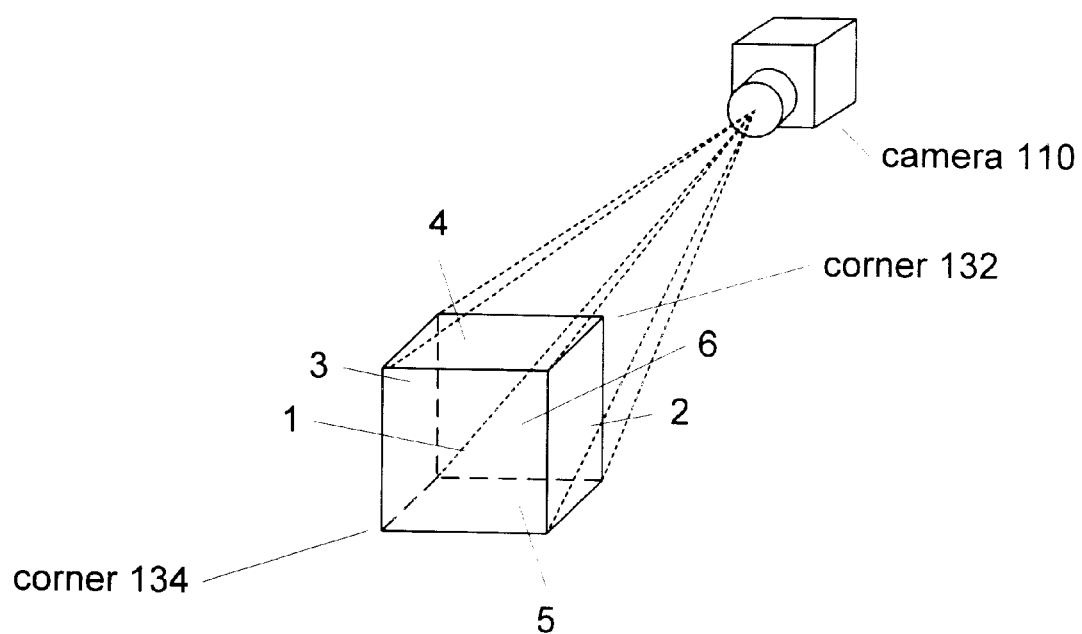
FIG. 5 illustrates a camera positioned in a location such that the camera is able to acquire an image of a cube-shaped object, wherein the acquired image includes visual information from three sides of the object.
Figure 6:
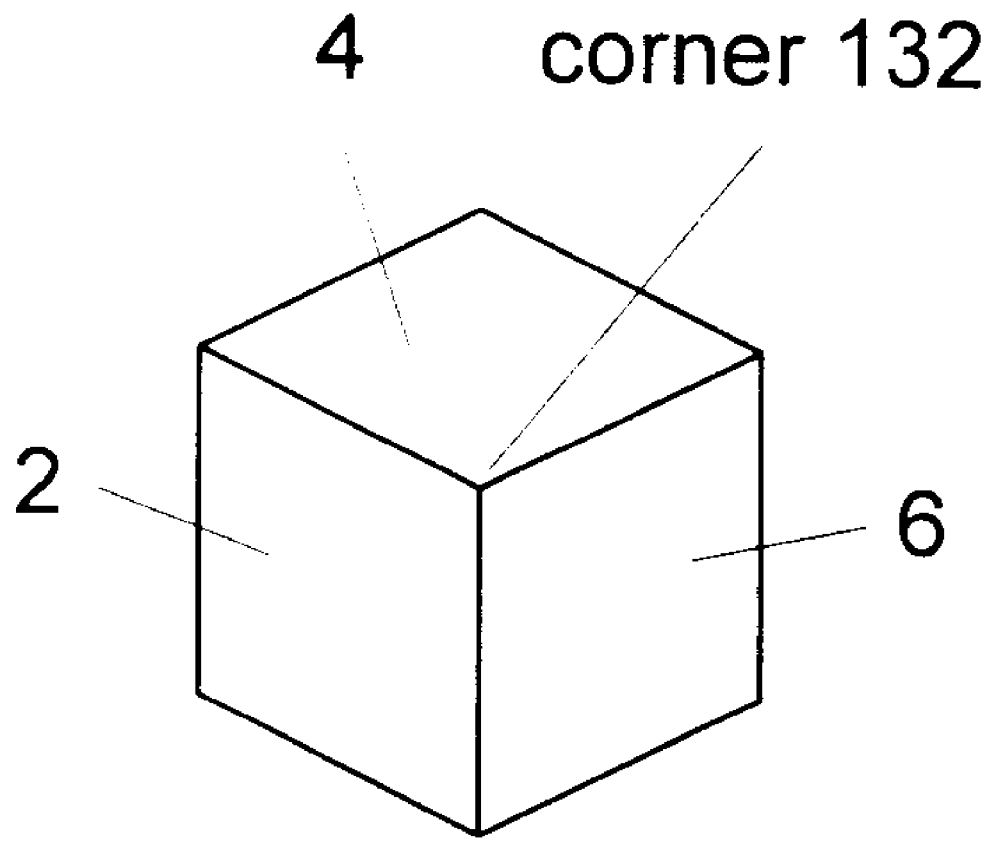
FIG. 6 illustrates one possible view of the object of FIG. 5, from the point of view of the camera of FIG. 5.

FIGS. 5–6: Acquiring Visual Information for Multiple Sides of an Object

FIG. 5 illustrates a cube-shaped physical object with numbered sides. A camera 110 is positioned in a location such that the camera is able to acquire an image of the object, wherein the acquired image includes visual information from three sides of the object, i.e., the top side 4 and sides 2 and 6. For example, in order to acquire such an image, the camera 110 may be positioned on an imaginary axis passing diagonally through the middle of the cube which connects two opposite corners of the cube, i.e., corner 132 and corner 134. The camera 110 may also acquire such an image when placed at various other locations. FIG. 6 illustrates one possible view of the object, from the point of view of the camera 110. As shown, the camera is able to acquire visual information for sides 4, 2, and 6 of the object.

In another embodiment, a camera may be positioned so that the camera can acquire visual information for two sides of the object, rather than three, if desired. For example, the camera 110 illustrated in FIG. 5 may be lowered so that the camera only acquires visual information for sides 2 and 6 of the object.

In various machine vision applications, varying numbers of sides of an object must be analyzed, with varying degrees of accuracy and efficiency. Thus, in various embodiments, varying numbers of cameras may be used in a machine vision system, and these cameras may be placed in various locations. For example, assuming that an application requires sides 1, 2, 3, 4, and 6 of the object of FIG. 5 to be analyzed (i.e., all sides except the bottom side 5), two cameras may be used, wherein one of the cameras is positioned such as shown by the camera 110 and the other camera is positioned "across" from the camera 110 such that the other camera can acquire visual information for the top side 4 and sides 3 and 1. Thus, the top side 4 may be imaged twice. When analyzing the images, the system may be configured to analyze the region corresponding to the top side 4 in only one of the images, to avoid processing redundancy. However, if desired, the top side 4 may be analyzed twice. For example, if the top side 4 includes complex visual information, the differing views from the two images may help to increase the accuracy of the analysis.

Extending this example, if the bottom side 5 is also required to be analyzed, the object may be rotated. In another embodiment, one or more additional cameras may be used. In this case, the object may be mounted in an apparatus allowing the additional camera(s) to image the bottom side 5. One example of such an apparatus is described below. In some cases, such an apparatus may effectively split the lateral sides 1, 2, 3, and 6 into two portions. Thus, the object may effectively have ten sides. For example, with respect to FIG. 5, such an apparatus may allow the camera 110 to acquire visual information for only the upper portions of sides 2 and 6. Thus, another camera may acquire visual information for the lower portions of sides 2 and 6, as well as visual information for the bottom side 5. Thus, in this case, four cameras may image all sides of the object, with the top side 4 and the bottom side 5 possibly being imaged twice.

Figure 2:
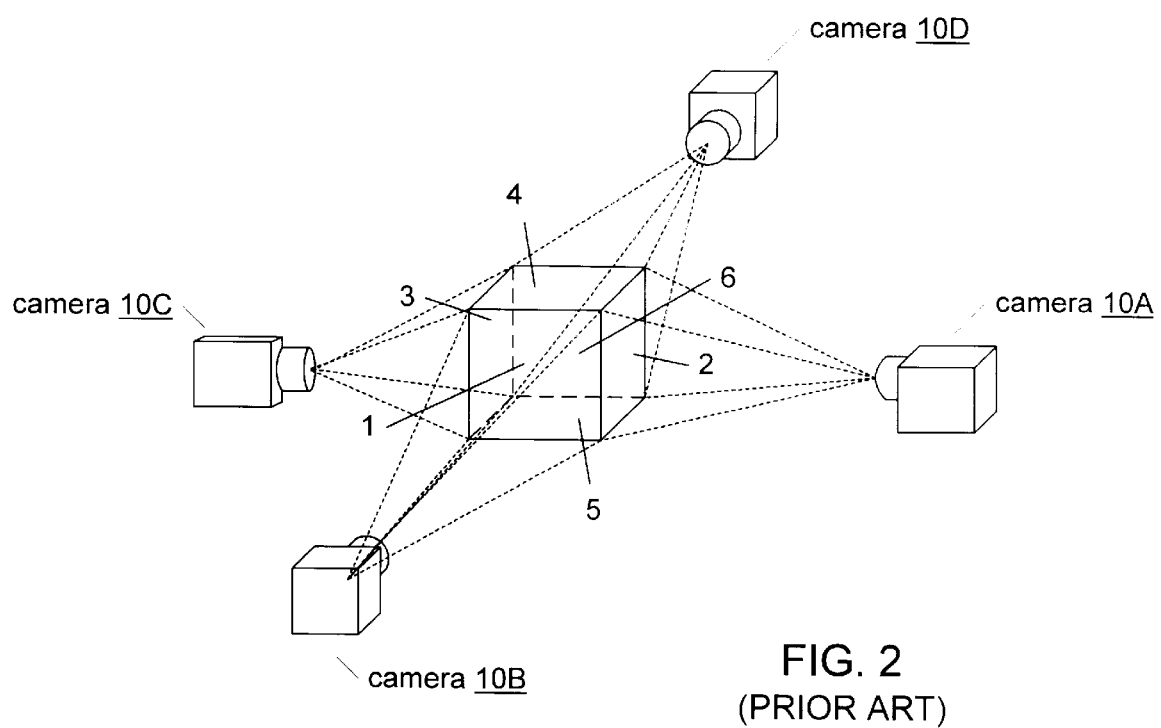
FIG. 2 illustrate a prior art system including four cameras, in which the cameras are able to acquire images of four respective sides of a cube-shaped object.

In some applications, the approaches to camera positioning described above may also be combined with the prior art approach described with reference to FIGS. 1 and 2. For example, assuming that the top side 4 and sides 2 and 6 are desired to be analyzed, one camera may be positioned as described above to acquire visual information for two sides, sides 2 and 6, and another camera may be positioned perpendicularly to the top side 4 to capture an image of only the top side, as is performed in the prior art.

In a machine vision application, objects typically move relative to the cameras that acquire images of the objects. For example, as shown in FIG. 3, objects may be propelled by a manufacturing apparatus 102. In some applications, two or more images of an object may be acquired by cameras in different positions while the object is in the same location, which may be accomplished by the positioning of the cameras and/or by halting the object momentarily. In other applications, different images of the object may be taken while the object is in different locations. For example, a first camera may acquire an image including visual information for three sides while the object is in a first position, and a second camera may acquire an image including visual information for three other sides while the object is in a second position. The system may be operable to track the movement of objects and coordinate the image acquisition by the various cameras and image analysis with this movement. The techniques for the ordering and timing of image acquisition that are used in a given application may depend on various factors, such as the physical space in which the system operates, the lighting conditions, the necessary throughput of the system, etc.

Figure 7:
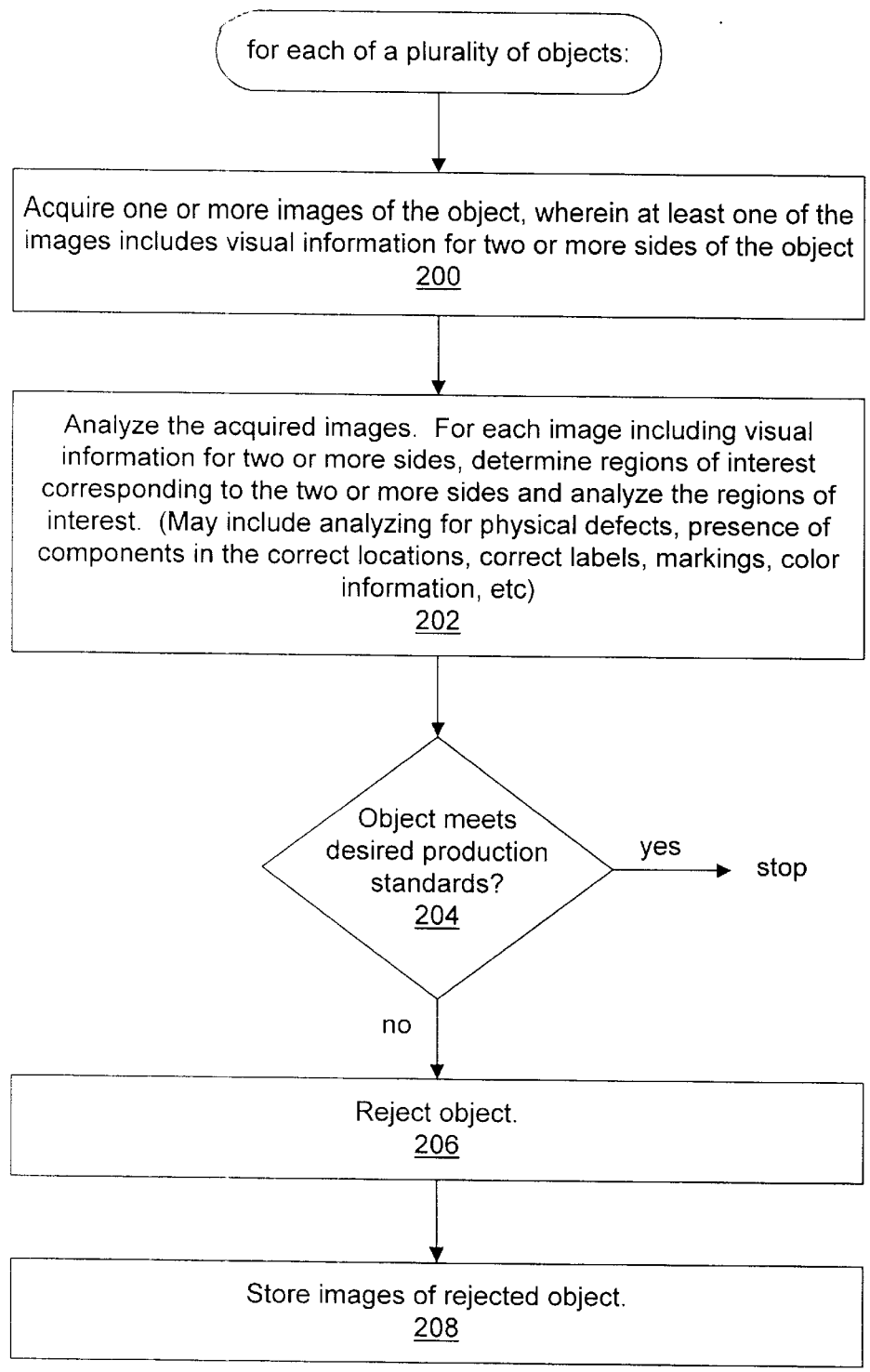
FIG. 7 is a flowchart diagram illustrating one embodiment of a method for inspecting a physical object.

FIG. 7—Method for Inspecting a Physical Object

FIG. 7 is a flowchart diagram illustrating one embodiment of a method for inspecting a physical object. As indicated in FIG. 7, the method may be performed for each of a plurality of objects. For example, in a manufacturing application, the method may be performed in order to inspect each manufactured object as the object moves along a manufacturing apparatus.

In step 200, one or more images of the object are captured or acquired, wherein at least one of the images includes visual information for two or more sides of the object. For example, the images may be acquired by cameras 110 and the resultant image data then provided to an image acquisition board for storage and subsequent processing. The images may be acquired by cameras 110 such as shown in FIG. 3, wherein at least one of the cameras is positioned in a location enabling the camera to acquire visual information from multiple sides of the object in a single image, as described above with reference to FIGS. 5 and 6.

The number of images acquired and the portion of the object imaged in each image may depend on a particular application. For example, some applications may require only a subset of the sides of the object to be inspected, while other applications may require all sides of the object to be inspected.

The system may be configured to trigger the acquisition of the images in any of various ways in order to image the objects appropriately. For example, the image acquisitions may be precisely coordinated with the movement and positioning of the object on a manufacturing apparatus, using timing or motion control techniques.

In step 202, the images acquired in step 200 may be analyzed. For example, as described above, the images may be received by one or more image acquisition boards or one or more computer systems and may be analyzed using image processing software.

For each image that includes visual information for multiple sides of the object, analyzing the image may comprise determining regions of interest within the image, wherein each region of interest corresponds to one side of the object. Each of these regions of interest may then be analyzed separately. The regions of interest within the image may be determined in various ways. For example, in one embodiment, the system is operable to acquire images such that the regions of interest have predetermined boundaries within the image. For example, as noted above, the image acquisitions may be precisely coordinated with the movement and positioning of the object on a manufacturing apparatus, using timing or motion control techniques. Thus the ROI may be determined based on pre-determined pixel boundaries in the image, which may be linear or nonlinear.

In another embodiment, the regions of interest corresponding to the object sides may be determined using image processing techniques, such as edge detection algorithms, pattern matching, color matching, Blob analysis, etc. For example, each of the sides of the object may have different colors, and thus color matching may be used to determine the ROIs for the different sides or faces of the object. It is also noted that a combination of techniques may be used to determine the ROIs. For example, predetermined boundaries may be used to determine candidate regions, and pattern matching and/or color matching may be performed in these candidate regions to further determine the correct boundaries for the ROIs.

The images, and/or determined ROIs within an image, may be analyzed using any of various techniques or algorithms designed to detect any of various characteristics or defects of the object. For example, analyzing the images (or ROIs) may comprise performing pattern matching algorithms, color matching algorithms, color and pattern matching algorithms, etc., in order to detect one or more characteristics of the object such as: physical surface defects (scratches, etc.); one or more components located correctly on the object; a correct label on the object; a correct marking on the object; correct color information on the object, etc.

In various embodiments, analyzing an image or ROI may comprise performing image processing or image analysis functions such as:

- filtering functions for smoothing, edge detection, convolution, etc.
- morphology functions for modifying the shape of objects in an image, including erosion, dilation, opening, closing, etc.
- thresholding functions for selecting ranges of pixel values in grayscale and color images
- particle filtering functions to filter objects based on shape measurements
- a histogram function that counts the total number of pixels in each grayscale value
- a line profile function that returns the grayscale values of the pixels along a line through the image
- particle analysis functions that compute such measurements on objects in an image as their areas and perimeters
- a caliper function that computes measurements such as distances, areas, and angles based on results returned from other image processing functions It is noted that the image processing functions listed above are exemplary only and that, in various applications any type of image processing function or algorithm may be performed.

The analyses performed on each image and/or performed on each region of interest (ROI) within an image may differ. For example, different sides of the object may require different types of inspection, e.g., in order to check for a correct label on one side and a set of correct components on another side.

For images including visual information from multiple sides of the object, the analyses performed on the ROIs corresponding to the sides of the object may take into account any skewing or distortion of the visual information of each side, as well as any variation in the lighting conditions of each side, which may be caused by the angle or spatial orientation of the object side with respect to the camera that acquired the image. For example, if the analysis performed for an ROI comprises performing a pattern matching algorithm, the pattern matching algorithm and/or the template image which the pattern information of the ROI is compared against may be different from what would otherwise be used if the image had been acquired from a camera faced perpendicularly to the plane comprising the object side (i.e., from a camera positioned as shown in the prior art FIGS. 1 and 2). In this case, for example, a "skewed" template image to be used in the pattern matching may be stored so that the pattern information of this template image will match the pattern information of the ROI, i.e., the angle and spatial orientation of the template image may match the angle and spatial orientation of the ROI. In another embodiment, the pattern matching algorithm may be altered to account for any skewing of the pattern information, e.g., by taking into account the depth of field of the camera, foreshortening of the image, etc.

It is noted that in some embodiments, one or more of the images may include "redundant" visual information. For example, with respect to the system illustrated in FIG. 3, the cameras 110A and 110B may be positioned so that each camera acquires visual information from the top side of an object and two additional sides of the object, such that all the sides of the object are imaged once and the top of the object is imaged twice. Although the top ROI is imaged twice, the visual information acquired be each camera will differ with respect to the spatial orientation of the information. If desired, the ROI corresponding to the object top may be analyzed for both acquired images, and the analysis may be correlated in a desired way. This may be useful, for example, if the object top includes complex pattern information. However, in a case where the object top may be sufficiently analyzed for one of the images, the system may be operable to ignore the ROI corresponding to the object top for the other image.

In step 204, the method may determine whether the object meets desired production standards, based on the results of the image analyses performed in step 202. As described above, if separate computer systems are used to analyze the images, the results from each computer system may be considered together in making this determination. The determination may be performed in any of various ways, as desired for a particular application. If the object does not meet the desired production standards, the object may be rejected, as shown in step 206. For example, the object may be removed from an assembly line or the system may store information indicating that the object failed the inspection. Also, images of the rejected object may be stored if desired, as shown in step 208.

It is noted that FIG. 7 represents one embodiment of a method for inspecting an object, and various steps of FIG. 7 may be reordered, combined, removed, altered, etc. In particular, steps may be performed at various times or in various orders and/or may be repeated. In some applications, for example, for a given object, a plurality of images may be acquired at different times, while the object is at different locations, due to movement along the manufacturing apparatus. Each of these images may be analyzed in real time as the image is acquired. Thus, the system may be operable to keep track of the analysis results for each image and coordinate the results of each analysis with the movement of the objects. Also, in some applications objects may be manufactured in stages, and the method may be performed multiple times after various stages, possible analyzing object sides multiple times, e.g., using different analysis criteria each time.

Figure 8:
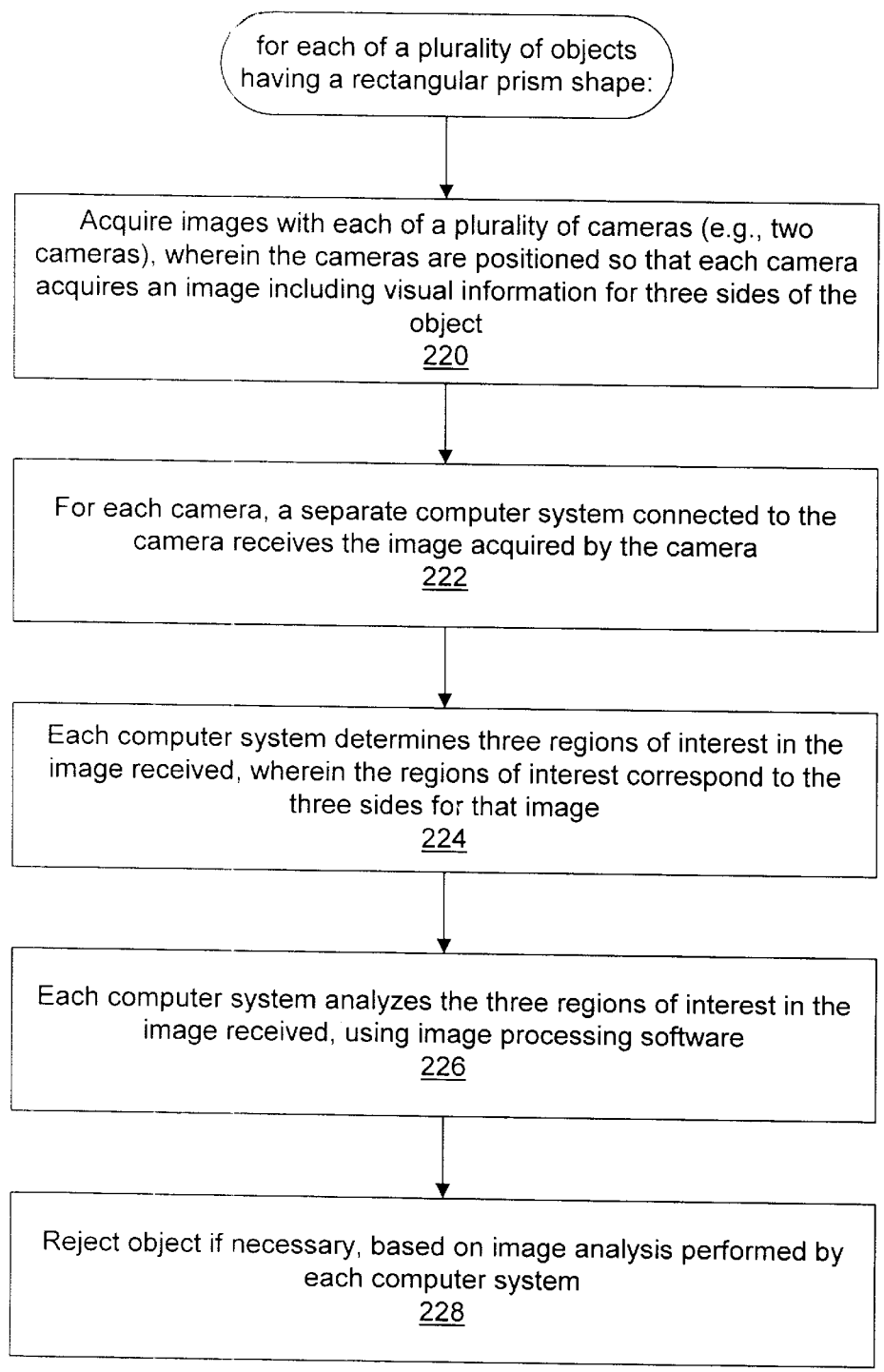
FIG. 8 is a flowchart diagram illustrating one embodiment of a method for inspecting a rectangular prism shaped object.

FIG. 8—Method for Inspecting a Rectangular Prism Shaped Object

FIG. 8 is a flowchart diagram illustrating one embodiment of a method for inspecting a rectangular prism shaped object. As shown in step 220, a plurality of images may be acquired with a plurality of cameras, wherein the cameras are positioned so that each camera acquires an image including visual information for three sides of the object. For example, as discussed above with reference to FIGS. 5 and 6, two cameras may be used to acquire visual information for five sides of the object (including the top side).

In step 222, for each camera, a separate computer system connected to the camera may receive the image acquired by the camera, as described above. The images may be received in any of various ways and may be of any type or may be in any format.

In step 224, each computer system may determine three regions of interest (ROIs) in the image received by the computer system, wherein the three ROIs correspond to the three sides of the object for that image.

In step 226, each computer system (or a single computer system) may analyze the three ROIs in the image received by the computer system, using image processing software as described above.

In step 228, the object may be rejected if necessary, based on the results of the image analyses performed by the computer systems, as described above.

It is noted that if the bottom sides of the objects also need to be imaged, the objects may be mounted in an apparatus that enables cameras to image the bottom side, as discussed below, or the objects may be rotated as necessary. In this case, the number of cameras in the system may be increased to image the bottom sides of the objects.

Exemplary Application: Inspecting Manufactured Capacitors

Figure 9:
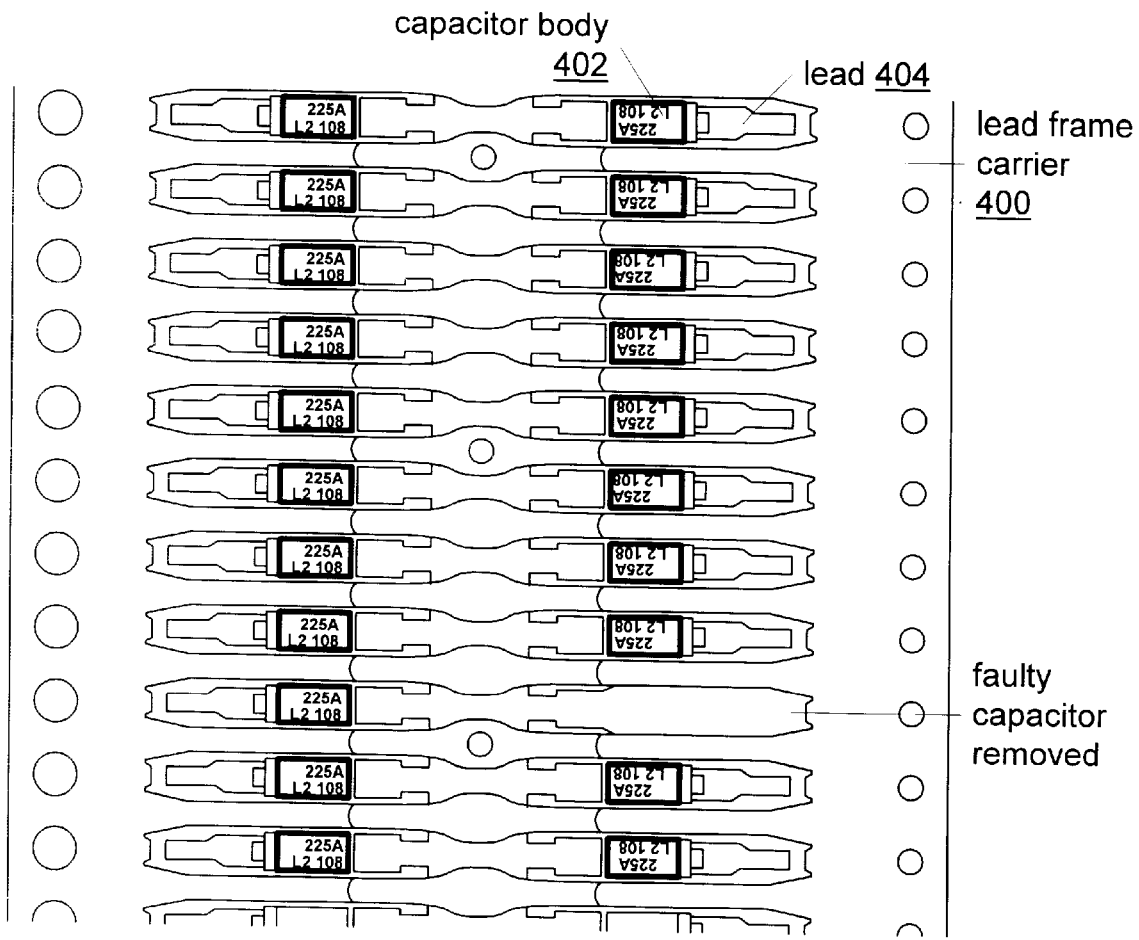
FIG. 9 is a diagram illustrating an exemplary lead frame carrier holding two rows of capacitors spaced at precise intervals from each other, as seen from the top.

One particular exemplary application is described in order to provide details regarding one specific embodiment of the system and method described above. In this example, manufactured capacitors having a rectangular prism shape are mounted on a lead frame carrier similar to the carriers commonly used in the production of a large variety of components. FIG. 9 is a diagram illustrating an exemplary lead frame carrier 400 holding two rows of capacitors spaced at precise intervals from each other, as seen from the top. (Larger capacitors may be mounted in a single row.) Each capacitor comprises a body 402 and a flat lead 404. Each lead 404 may later be folded under the corresponding capacitor body 402.

As shown, the top sides of the capacitor bodies may be marked with text (type and value markings), e.g., from a laser marking machine. A machine vision system may operate to inspect the capacitor bodies for correct text markings, as well as various other markings or defects. If a capacitor does not meet the desired production standards, the faulty capacitor may be removed, e.g., by punching it out of the lead frame carrier 400. FIG. 9 indicates an empty space where a faulty capacitor has been removed from the lead frame carrier.

Figure 10:
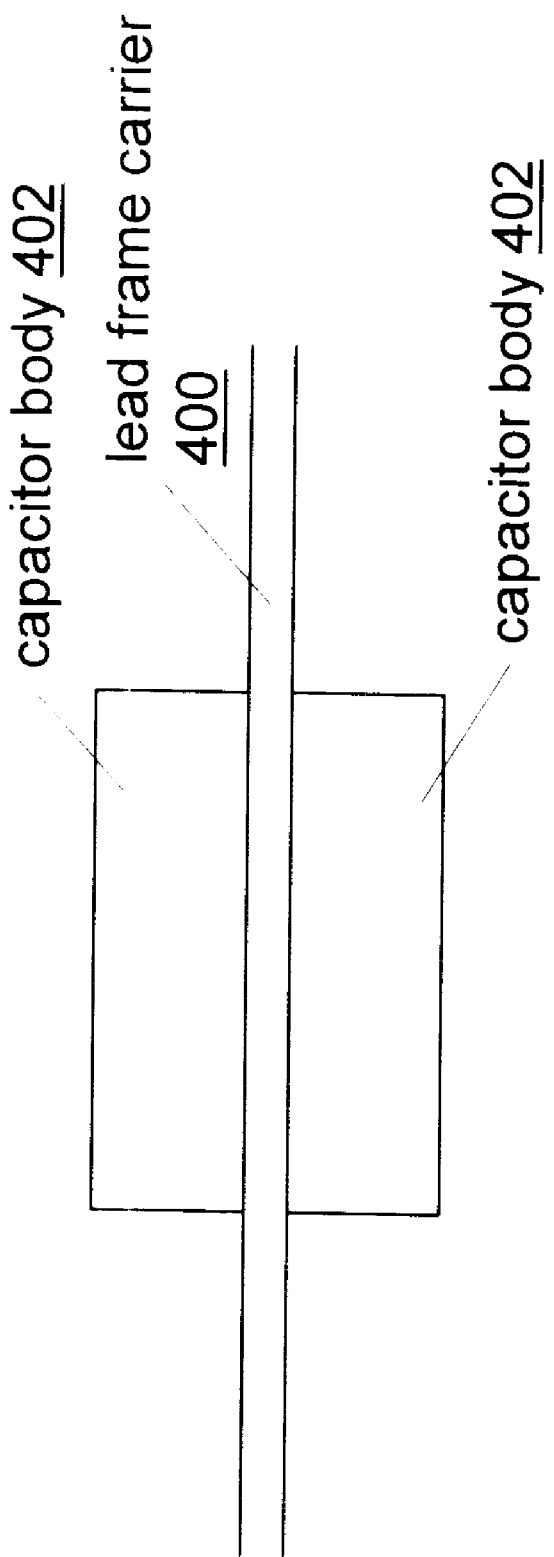
FIG. 10 illustrates a side view of the lead frame carrier of FIG. 9.

FIG. 10 illustrates a side view of the lead frame carrier 400. As shown in FIG. 10, each capacitor body 402 projects above and below the lead frame carrier 400, so that the lead frame carrier effectively divides the four lateral sides into two halves. Thus, the capacitor bodies effectively have ten sides: a top side, a bottom side, and eight (4*2) lateral sides. As described above with reference to FIG. 5, the machine vision system may be operable to inspect each of these ten sides, using a total of four cameras.

The lead frame carrier may be fed into an apparatus that propels the carrier forward, e.g., though the use of sprocket wheels or other means. This apparatus is operable to propel the carrier past the set of cameras. The system may be operable to detect the beginning of the lead frame carrier as the carrier moves along the apparatus, in order to coordinate the movement of the capacitors with the timing of the image acquisitions. (Other systems may continuously feed objects along instead of using discrete carriers.)

Figure 11:
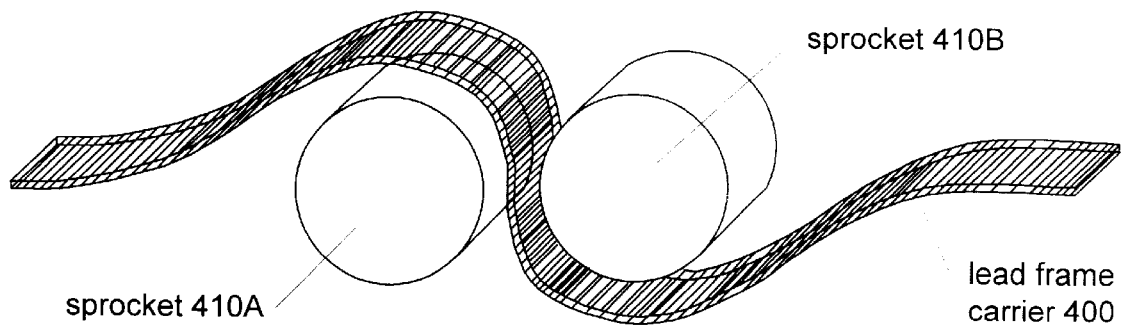
FIG. 11 illustrates the lead frame carrier of FIG. 9 being passed over a set of sprockets causing the carrier to flex, such that cameras are able to image the inner sides of the mounted capacitors.

In this example, the capacitor bodies are mounted very close together on the lead frame carrier 400, making it difficult for a camera to image the sides of the capacitor bodies that face each other. Thus, in order to acquire images of all the sides, the lead frame carrier 400 may be passed over a set of sprockets 410 causing the carrier to flex, as shown in FIG. 11. In one embodiment, sprocket wheels of different diameters may be interchanged, in order to accommodate different capacitor sizes.

As a pair of two consecutive capacitor bodies passes over the top of the sprocket 410A, the gap effectively widens between the pair of capacitor bodies, allowing one camera to image the inner side of one of the capacitor bodies and allowing another camera to image the inner side of the other capacitor body. Also, one of the cameras can image the top and one of the outer sides of one of the capacitor bodies, and the other camera can image the top and the other outer side of the other capacitor body, so that each camera acquires visual information from three sides, similarly as shown in FIG. 6. Thus, the two cameras can together image each of the five upper sides of the capacitor bodies. Another two cameras mounted below the sprocket 410B can image each of the five lower sides of the capacitor bodies in a similar manner.

As noted, the capacitors may be mounted in two rows on the lead frame carrier. In one embodiment, each image acquired by a camera includes visual information for two capacitors. Thus, the image processing software may be operable to determine six regions of interest (ROIs) in the image that correspond to the sides of the capacitor bodies (three sides for each of the capacitor bodies in the image). In another embodiment, each camera may be devoted to acquiring visual information for a single row of capacitors, so that each image includes visual information for a single capacitor body. Thus, in this embodiment, the number of cameras used in the system may double.

As noted above, the top side of the capacitor bodies may be marked with text. Thus, the analysis performed for the top side ROI may comprise performing a pattern matching (e.g., character recognition) algorithm. The remaining sides of the capacitor bodies may be expected to have a uniform color and surface unless defective. Thus, simpler imaging processing functions may be used to analyze these sides.

The types of cameras used and the specifications for the optics may vary, e.g., depending on such factors as the required field of view and mechanical constraints determining the distance between the lens and the capacitor body. Depth of view may be an important consideration, since the camera is not mounted orthogonal to the capacitor body, but at an angle. In one embodiment, line scan cameras are used, but any other type of camera or other device to acquire images may also be used.

Various types of illumination systems may be used. For example, in one embodiment, two line light illuminators are used, either based on a light source coupled via fiber optics or on a strip of high intensity white LEDs and a suitable diffuser. The intensity level may match the exposure time of the cameras. In various embodiments, light sources such as green light sources and infrared may be used. By adjusting the light source, image contrast may be improved.

In one embodiment, each camera is connected to a separate digital frame grabber coupled to its own processor. Four 4-slot PXI chassis may be used, e.g., wherein each chassis houses a 700 MHz CPU running image processing software to analyze the images acquired by the coupled camera. A fifth CPU/PXI chassis may gather the analysis results from the other four units and may also perform other functions, such as providing a man-machine interface (MMI), handling motion control of the mechanics, etc.

Upon detection of a faulty capacitor, the corresponding image may be stored as a file. For example, such images may be stored on four different mass storage units. As described above, the position of the faulty capacitor may be tracked, and the capacitor may be removed from the lead frame carrier when appropriate.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for analyzing an object having a plurality of sides, the method comprising:

acquiring a first image of the object, wherein the first image includes visual information for at least two sides of the object;

determining a plurality of regions within the first image, wherein each region corresponds to one side of the object; and analyzing each of the regions separately using image processing software;

wherein said analyzing each of the regions comprises analyzing the visual information for the at least two sides of the object, wherein said analyzing each of the regions analyzes the at least two sides of the object.

2. The method of claim 1, wherein the object is a manufactured object, wherein said acquiring and analyzing are performed for a machine vision application to inspect a plurality of manufactured objects, the method further comprising:

for each manufactured object:
      determining whether the manufactured object meets desired production standards, based on said analyzing;

rejecting the manufactured object if the manufactured object does not meet the desired production standards.

3. The method of claim 1,
wherein the first image includes visual information for at least three sides of the object.

4. The method of claim 1,
wherein said analyzing comprises analyzing the visual information to determine one or more physical characteristics of at least one of the sides of the object.

5. The method of claim 1,
wherein said analyzing comprises analyzing the visual information of the image for one or more of:
a physical defect on a side of the object;
a component located correctly on the object;
a correct label on the object;
a correct marking on the object;
correct color information on the object.

6. The method of claim 1,
wherein said analyzing comprises performing one or more of the following:
a pattern matching algorithm;
a color matching algorithm;
a color and pattern matching algorithm.

7. The method of claim 1, further comprising:
acquiring a plurality of images of the object, wherein each image includes visual information for at least two sides of the object, wherein the first image is one of the plurality of images;
analyzing each of the plurality of images using image processing software.

8. The method of claim 1,
wherein the object is a rectangular prism having six sides;
wherein the first image includes visual information for three sides of the object.

9. The method of claim 8,
wherein a first corner of the object is defined by an intersection of each of three planes including the three sides for which visual information is included in the first image;
wherein a second corner of the object is defined by an intersection of each of three planes including the three sides for which visual information is not included in the first image;
wherein the first image is acquired by a camera positioned along a diagonal axis connecting the first corner and the second corner.

10. A machine vision system for inspecting a plurality of objects having multiple sides, the system comprising:
a first camera operable to acquire images of the objects, wherein for each object, the first camera is operable to acquire a first image having visual information for two or more sides of the object;
a computer system connected to the first camera, wherein the computer system includes a processor and memory, wherein the computer system is operable to receive acquired first images from the first camera;
wherein the memory of the computer system stores image processing software;
wherein the processor of the computer system is operable to execute the image processing software in order to analyze the first images received from the cameras;
wherein, in analyzing the first image, the processor is operable to:
determine a plurality of regions within the first image, wherein each region corresponds to one side of the object; and
execute the image processing software in order to analyze each of the regions separately, wherein said analyzing each of the regions analyzes the visual information for the two or more sides of the object;
wherein said analyzing the images inspects the plurality of objects.

11. The system of claim 10,
wherein the first image acquired for each object by the first camera includes visual information for at least three sides of the object.

12. The system of claim 10,
wherein said analyzing the first image comprises analyzing the visual information to determine one or more physical characteristics of at least one of the sides of the object.

13. The system of claim 10,
wherein said analyzing the first image comprises analyzing the visual information of the image for one or more of:
a physical defect on a side of the object;
a component located correctly on the object;
a correct label on the object;
a correct marking on the object;
correct color information on the object.

14. The system of claim 10,
wherein said analyzing the first image comprises performing one or more of the following on the first image:
a pattern matching algorithm;
a color matching algorithm;
a color and pattern matching algorithm.

15. The system of claim 10,
wherein each image acquired by the cameras includes visual information for at least two sides of the object.

16. A machine vision system for inspecting a plurality of objects having multiple sides, the system comprising:
a plurality of cameras operable to acquire images of the objects, wherein for each object, a first camera is operable to acquire a first image having visual information for two or more sides of the object;
a plurality of computer systems, wherein each computer system is connected to one of the cameras, wherein each computer system includes a processor and memory, wherein each computer system is operable to receive acquired images from the camera connected to the computer system;
wherein the memory of each computer system stores image processing software;
wherein the processor of each computer system is operable to execute the image processing software in order to analyze the images received from the camera connected to the computer system;
wherein said analyzing the images comprises the computer system connected to the first camera analyzing the first image acquired for each object;
wherein in analyzing the first image acquired for each object, the computer system connected to the first camera is operable to:
determine a plurality of regions within the first image, wherein each region corresponds to one side of the object; and
analyze each of the regions separately, wherein said analyzing each of the regions analyzes the visual information for the two or more sides of the object;

wherein said analyzing the images inspects the plurality of objects.

17. A memory medium for analyzing an object having a plurality of sides, the memory medium comprising program instructions executable to:

receive a first image of the object, wherein the first image includes visual information for at least two sides of the object; and analyze the first image, wherein said analyzing the first image comprises:

determining a plurality of regions within the first image, wherein each region corresponds to one side of the object; and analyzing each of the regions separately;

wherein said analyzing each of the regions analyzes the visual information for the at least two sides of the object, wherein said analyzing each of the regions analyzes the at least two sides of the object.

18. The memory medium of claim 17, wherein the first image includes visual information for at least three sides of the object.

19. The memory medium of claim 17, wherein said analyzing the first image comprises analyzing the visual information to determine one or more physical characteristics of at least one of the sides of the object.

* * * * *